(12) United States Patent
Castano de la Serna

(10) Patent No.: US 8,122,383 B2
(45) Date of Patent: Feb. 21, 2012

(54) SYSTEM AND METHOD FOR PHOTO ALBUM CREATION USING TELEVISION

(75) Inventor: Guillermo Castano de la Serna, Tijuana, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 798 days.

(21) Appl. No.: 11/799,240

(22) Filed: May 1, 2007

(65) Prior Publication Data

US 2008/0276202 A1    Nov. 6, 2008

(51) Int. Cl.
G06F 3/048    (2006.01)
(52) U.S. Cl. ...................................... 715/855; 715/811
(58) Field of Classification Search .................. 715/730, 715/853, 854, 811, 855
See application file for complete search history.

(56) References Cited

U.S. PATENT DOCUMENTS

| | | | | |
|---|---|---|---|---|
| 6,034,684 A * | 3/2000 | Proehl et al. | ................... | 715/764 |
| 6,154,755 A * | 11/2000 | Dellert et al. | ................... | 715/202 |
| 7,020,848 B2 | 3/2006 | Rosenzweig et al. | ......... | 715/855 |
| 7,464,110 B2 * | 12/2008 | Pyhalammi et al. | ................... | 1/1 |
| 7,543,244 B2 * | 6/2009 | Matthews et al. | ............. | 715/811 |
| 2002/0070982 A1 * | 6/2002 | Hill et al. | ....................... | 345/835 |
| 2002/0167538 A1 * | 11/2002 | Bhetanabhotla | .............. | 345/700 |
| 2005/0044508 A1 * | 2/2005 | Stockton | ........................ | 715/811 |
| 2005/0050043 A1 | 3/2005 | Pyhalammi et al. | .............. | 707/6 |
| 2005/0111737 A1 | 5/2005 | Das et al. | ........................ | 382/190 |
| 2005/0192924 A1 * | 9/2005 | Drucker et al. | ..................... | 707/1 |
| 2006/0161635 A1 * | 7/2006 | Lamkin et al. | ................ | 709/217 |
| 2007/0063998 A1 * | 3/2007 | Mahesh | ......................... | 345/419 |
| 2007/0220580 A1 * | 9/2007 | Putterman et al. | ............. | 725/134 |

OTHER PUBLICATIONS

Matthew Cooper, Jonathan Foote, Andreas Girgensohn; "Automatically Organizing Digital Photographs Using Time and Content" 2003 IEEE, pp. 749-752.

Phillippe Mulhem, Joo-Hwee Lim; "Home Photo Retrieval: Time Matters", 2007 website printout, www.springerlink.com/content/vfk0m69trm3qb382/?print=true.

Neil O'Hare, Cathal Gurrin, Gareth J.F. Jones, Alan F. Smeaton, "Combination of Content Analysis and Context Features for Digital Photograph Retrieval", Centre for Digital Video Processing, Adaptive Information Clusters Dublin City University, Dublin, Ireland.

* cited by examiner

*Primary Examiner* — Omar Abdul-Ali
(74) *Attorney, Agent, or Firm* — John L. Rogitz

(57) ABSTRACT

A system and method for classifying photographs using a TV and a remote control, and then subsequently searching for previously classified photos. A multi-level GUI that includes a "who" GUI operable to classify a photograph according to a proper name of a person appearing in the photograph and a "what" GUI operable to classify a photograph according to a name or genre of a subject associated with the photograph are provided. A user of the remote control navigates through levels of the GUI to classify photographs provided to the TV without having to manually type in text using alphabet keys.

18 Claims, 10 Drawing Sheets

SYSTEM

SYSTEM

PART OF REMOTE

TOP LEVEL SCREEN DISPLAY

OVERALL CLASSIFICATION LOGIC

"WHO GUI" PORTION

"WHO GUI" PORTION

| ROOT CATEGORY | CHILD CATEGORY | INDEX | WEIGHT |
|---|---|---|---|
| X000001 | X00000D | 1 | 10 |
| X000001 | X00000E | 2 | 10 |
| X000001 | X00000A | 3 | 10 |
| X000001 | X000012 | 4 | 1 |
| X000002 | X00000C | 1 | 10 |
| X000002 | X00000F | 2 | 4 |
| X000002 | X000011 | 3 | 10 |
| X000002 | X000005 | 4 | 10 |

FIG. 9

"WHO GUI"

US 8,122,383 B2

SYSTEM AND METHOD FOR PHOTO ALBUM CREATION USING TELEVISION

FIELD OF THE INVENTION

The present invention relates generally to systems and methods for creating photo albums using televisions and TV remote controls.

BACKGROUND OF THE INVENTION

Digital picture viewers have been developed for personal computers that make it possible to view, using the computer monitor, digital photographs. PC-based picture viewer applications enable users to administer the contents of their digital camera flash memories. Among other things, managing digital photos using a PC addresses the complexities introduced by naming serialization conventions that are used by digital cameras, which can become difficult to administer once they lose their meaning as they become part of folders where they are simply copied.

The present invention recognizes, however, that many users are not familiar enough to take full advantage of the picture viewer applications that have been provided. Even with a full keyboard, people feel reluctant to rename their pictures to more meaningful descriptions. Furthermore, as recognized herein the computer experience is for the most part a single person experience, in which a single user faces the computer monitor at a short distance to operate the picture viewer application. The present invention recognizes the desirability to provide a means to manage digital pictures in a carefree, fun group experience in the manner of watching TV.

Indeed, as further recognized herein, a TV-centric application for managing digital pictures has become increasingly attractive with the advent of large screen liquid crystal display (LCD)/plasma displays and connections such as digital visual interface (DVI)/high definition multimedia interface (HDMI) that enable televisions to display and interface with computer applications. The present invention further recognizes the desirability of providing a way to classify digital pictures using a simple input device that does not require inputting the letters of classification indicia such as persons' names, picture locations, etc.

SUMMARY OF THE INVENTION

The present invention is directed to an easy way to classify digital photographs, also referred to herein as "pictures" or "photos", by enabling a user to describe the pictures in terms of subject name and place name without having to type in the letters of the subject or place name in a manner that is compatible with the TV viewing experience.

Accordingly, a method for classifying photographs using a TV having a TV display and a remote control wirelessly communicating with the TV includes providing a multi-level graphical user interface (GUI). The GUI can be a "who" GUI operable to classify a photograph according to a name of a person appearing in the photograph. In addition or alternatively, the GUI can be a "what" GUI operable to classify a photograph according to a name or genre of a subject associated with the photograph. A user of the remote control can navigate through levels of the GUI presented on the TV display to select a classification for a photograph provided to the TV. The user can classify the photograph without having to manually type in text using alphabet keys.

In non-limiting implementations both a "who" GUI and a "what" GUI are provided. Advantageously, the GUI can dynamically change in response to user selections.

When the GUI is a "what" GUI it can include a "family" select element, selection of which causes a family relations level to appear on the TV display. It may also include a geographic select element and an event select element. A "who" GUI may include a family relations element selection of which causes name select elements, and/or alphabetic select elements, to appear on the TV display.

In another aspect, a TV system includes a TV with a TV display. A remote control wirelessly communicates with the TV. A processor is associated with the TV and presents a GUI on the display. The processor receives GUI select signals from the remote control that are related to classifying digital photos by person(s) in the photo and/or by subject matter in the photo(s). According to present principles, the processor classifies the photos in accordance with the GUI signals. The GUI signals are generated without having to manually type in text using alphabet keys.

In still another aspect, a TV system has a TV including a TV display, a remote control wirelessly communicating with the TV, and a processor associated with the TV and presenting a GUI on the display. The processor receives GUI select signals from the remote control that are related to searching for digital photos by person(s) in the photo and/or by subject matter in the photo(s). The processor returns photos in accordance with the GUI signals for presentation on the display. The GUI signals are generated without having to manually type in text using alphabet keys.

The details of the present invention, both as to its structure and operation, can best be understood in reference to the accompanying drawings, in which like reference numerals refer to like parts, and in which:

BRIEF DESCRIPTION OF THE DRAWINGS

FIGS. 8 and 9 are non-limiting data structures that can be used to dynamically change the GUI in response to user selections.

DETAILED DESCRIPTION OF THE PREFERRED EMBODIMENT

Figure 1:
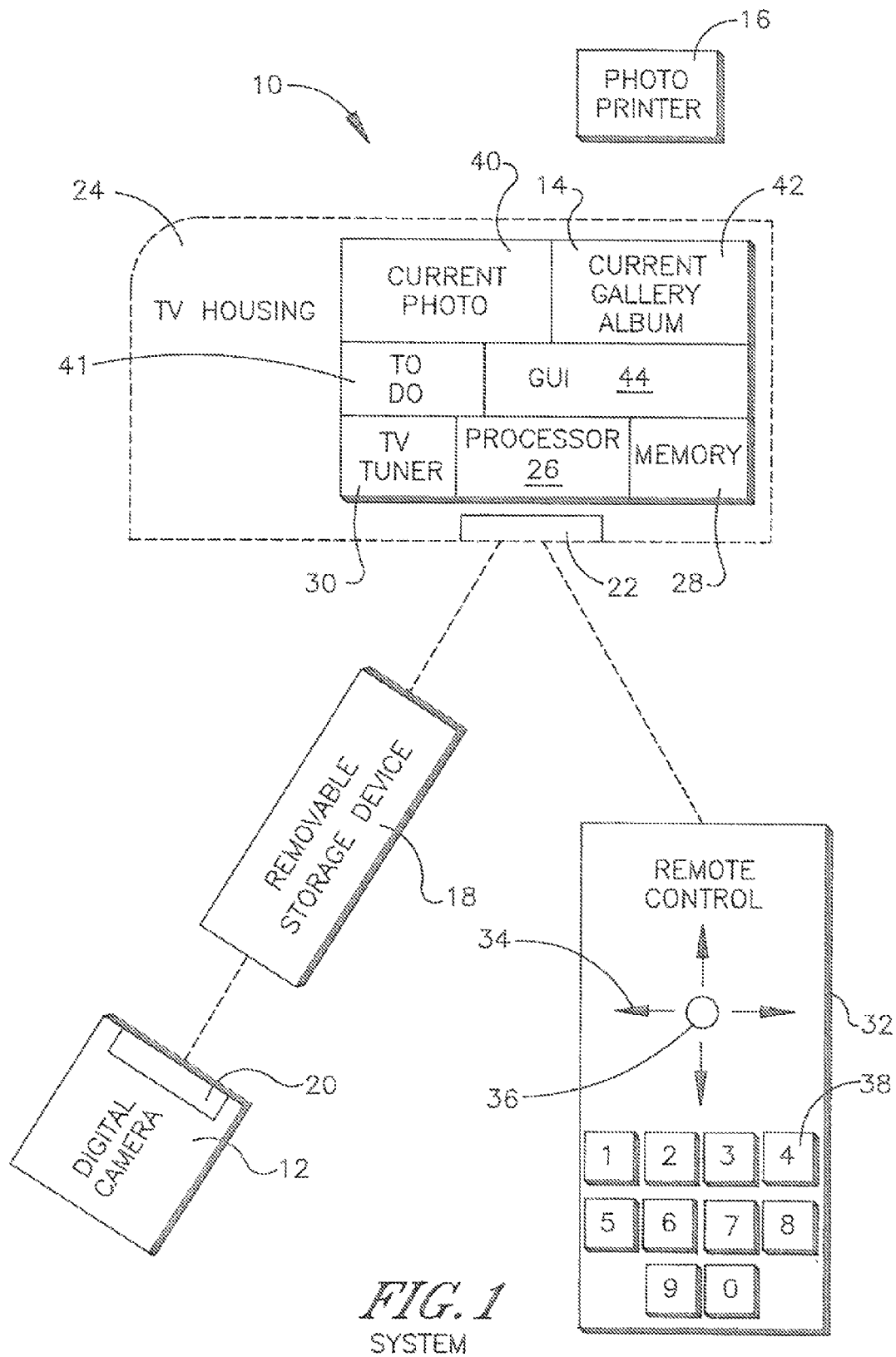
FIG. 1 is a block diagram of an exemplary system in accordance with the present invention.

Referring initially to FIG. 1, a system is shown, generally designated 10, for enabling a person to take digital photographs using a still or video camera 12 and to then use a television video monitor 14 to view the photographs and to easily and conveniently classify the photographs using the identity of persons in the photos and/or the identity of subject matter of the photo, such as event and/or geographic location. A photo printer 16 may be provided if desired to print the photos.

The monitor 14 can be any suitable TV monitor, and in some embodiments is a high definition (HD) TV monitor. The digital photos may but not must be in JPEG format. The source of photos can be not only a digital camera 12 but also scanned files from, e.g., 35 mm slides or prints, or images created at photo developing facilities that provide CDs/online images from film.

By "television system" is meant a system that can present televised content, including, e.g., direct view cathode ray tube (CRT) TVs, rear projection CRT TVs, rear projection liquid crystal display (LCD) TVs, (all of which have a monitor and TV tuner in same housing), as well as certain plasma TVs which may include a separate media box with tuner(s) and removable memory slots. The logic below may be implemented in a set-top box that includes a tuner and a Memory Stick® slot and that is associated with a separately-housed TV monitor. The below-described control device could be supplied with a set-top box, or it can be another TV product remote control device, or the viewer controls described below could be embodied as buttons on the set top box itself or on the TV. "TV system" also includes media personal computers having TV tuners.

In the exemplary system 10 shown in FIG. 1, the photographs can be stored on a storage medium 18 that advantageously can be a portable solid state memory device such as a Sony Memory Stick® that can be removably engaged with a memory device bay 20 of the camera 12 to load the medium 18 with digital photos, and then disengaged with the camera 12 and engaged with a memory device bay 22 of a TV housing 24 that is associated with the monitor 14. When the storage medium 18 is engaged with the housing 24, a TV processor 26 can access the digital photographs in accordance with disclosure below. As mentioned above, the processor 26 and/or tuner described below alternatively can be in a set-top box.

In alternate embodiments, the digital photos can be stored on non-portable memory media, with the processor 26 communicating, via wired links such as USB links or wireless links, with the memory media to access the photos. Also, a so-called "PictBridge" link, which is used to connect digital camera to printers, may be used to connect the TV processor to the printer, in which case the removable storage medium need not be removed from the TV and inserted into the printer. Or, the photos can be uploaded from the TV to an Imagestation™ or other printing service.

Returning to the exemplary system 10 shown in FIG. 1, the processor 26 can also access a memory 28 inside the housing 24. The memory 28 may be any suitable memory device and it can store program code that embodies the logic set forth further below, for execution of the logic by the processor 26. An analog and/or digital TV tuner 30 which may communicate with the processor 26 is also included in the housing for displaying TV programming on the monitor 14.

In accordance with present principles, a viewer of the TV monitor 14 can easily and conveniently select digital photos that can be displayed on the TV monitor 14 for classification and/or search using a convenient input/output device. In the exemplary embodiment shown in FIG. 1, the viewer can manipulate a wireless TV remote control device 32 to classify and/or search for photos. In one embodiment, the remote control device 32 includes up, down, and side arrows 34, a select button 36, and numeric buttons 38, for operation discussed below. Alternatively, the viewer can use similar buttons on the TV itself. As set forth further below, by manipulating the remote control 32, a user can classify a current photo displayed in a current photo pane 40 of the TV display 14, with the current photo perhaps being selected from thumbnails of photos in a "to do" pane 41. When classified, the photo in the photo pane 40 may become a member of a current gallery or album thumbnails of photos of which may be simultaneously displayed in a current gallery or album pane 42. As will become clearer momentarily, the user accomplishes classification and search using a graphical user interface (GUI) window 44 on the TV display 14.

Figure 2:
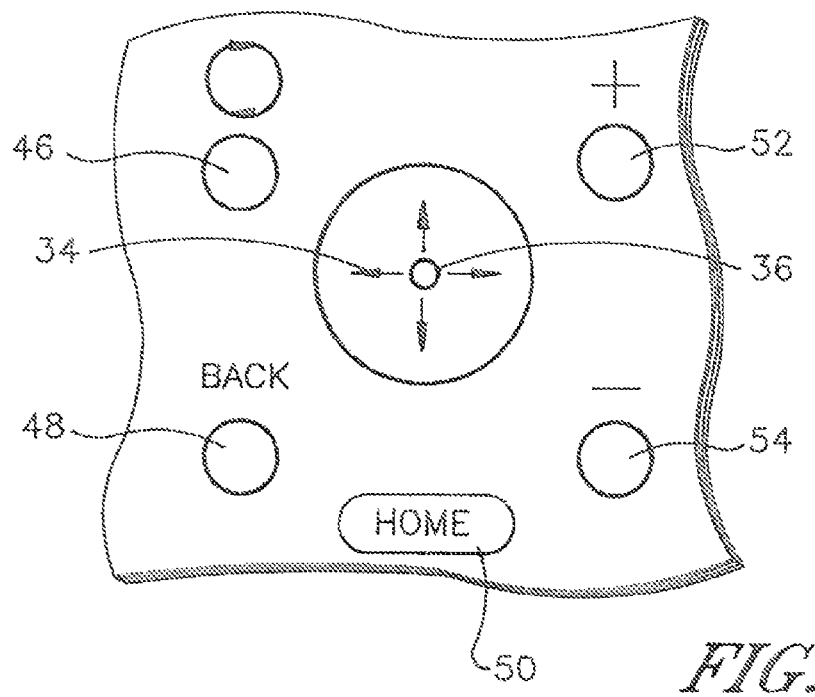
FIG. 2 is a close-up view of part of a non-limiting TV remote that can be used in accordance with present principles.

FIG. 2 shows additional details that may included on a non-limiting remote control 32. In addition to the arrow buttons 34, which can be used to navigate through the GUI, and the select button 36, which can be used to indicate a selection of a GUI element, the remote control 32 may include a manipulable recycle bin element 46. By manipulating this element, the photo in the current photo pane 40 is sent to a recycle bin file in, e.g., the memory 28, which may retain up to a predetermined number of the mostly recently deleted photos, e.g., one hundred for retrieval by a user in case of a mistaken deletion.

Additionally, the remote control 32 may include a manipulable back element 48 which can be manipulated to return to a previous GUI section or level, in some implementations aborting changes made in the section or level from which the "back" function is initiated. Further, a home element 50 may be manipulated to return to the main GUI menu. Also, upper and lower multipurpose elements 52, 54 that may change function depending on the context of the GUI and the action required. For example, the multipurpose elements 52, 54 may be used for page up/down, respectively, zoom in or out, increase/decrease display contrast, etc. The elements on the remote 32 may be buttons or keys or other appropriate remote control element.

Figure 3:
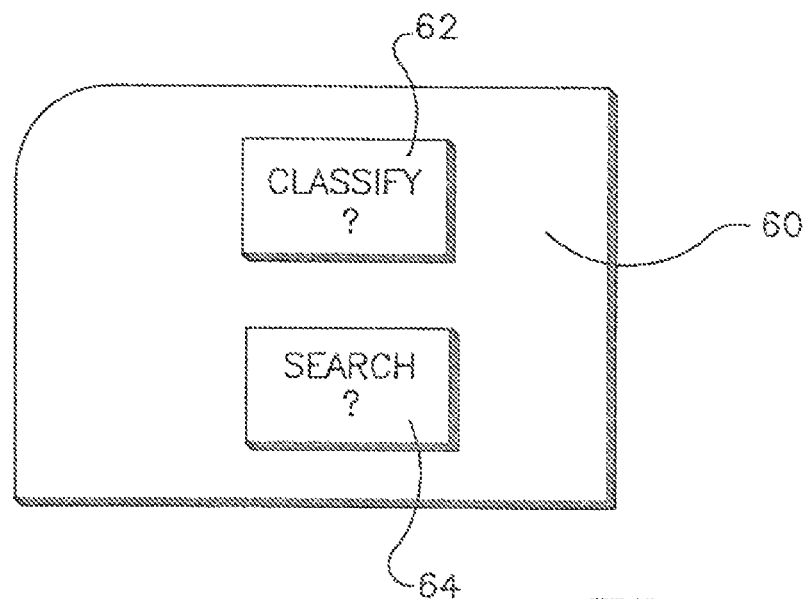
FIG. 3 is a screen shot of the TV display presenting the top level menu of a non-limiting graphical user interface (GUI)

FIG. 3 shows that a top level menu screen 60 may be presented on the TV display that has a classify select element 62 and a search select element 64. A user can select one of the elements 62, 64 by appropriately manipulating the remote control arrows 34 to position a screen cursor over the desired element, and then manipulating the select button 36 on the remote control 32. The top level menu screen 60 may be invoked automatically when, e.g., a removable memory device is engaged with the TV to automatically download photos into the TV. Or, the menu screen 60 may be invoked by entering a TV menu system that has a "manage photos" option. Or, the classification method can be triggered by the reception of Bluetooth files from the camera, etc.

Figure 4:
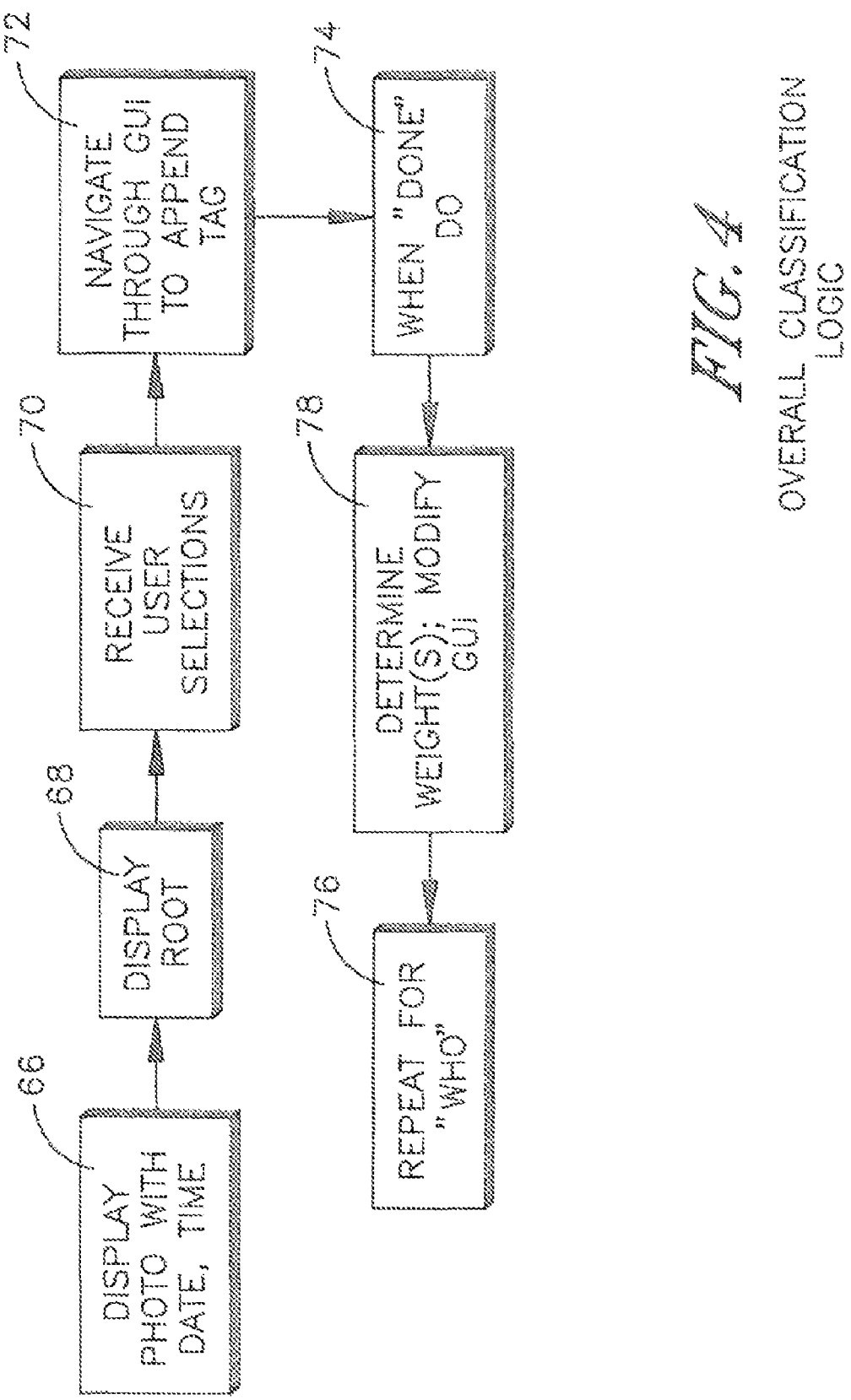
FIG. 4 is a flow chart of non-limiting logic that can be used to classify a photo.

Assume the user wishes to classify a photo. Assume further that in one non-limiting implementation, thumbnails of a subset of the photos on the removable medium are displayed in the "to do" pane 41 (FIG. 1). The user can select one of the photos using the remote control 32 for display of the full image in the current photo pane 40. FIG. 4 now takes on relevance to the discussion.

The selected photo may be displayed in the current photo pane 40 at block 66 of FIG. 4. Typically, a digital photo includes metadata that indicates the time and date the photo was taken and/or downloaded into the TV, and one or both of these times and dates may be displayed below the photo if desired. Also, in some implementations certain control buttons may be presented below the photo that the user can select to cause the photo to be moved into the current album displayed in the album pane 42, deleting (or not) the photo from the memory device from whence it came. A control button may also be provided to allow the user to delete the photo, in which case the photo is moved to the recycle bin file in the TV, where it will be retained with the most recent "N" (e.g., 100) deleted photos. Preferably, when the user selects "delete", the user is not subsequently prompted "are you sure you want to delete?" but rather the photo is immediately sent to the recycle bin file without further ado.

In accordance with present principles, the user is given the ability to classify the photo in the current photo pane 40 according to a name of a person in the photograph and/or according to a name or genre of a subject associated with the photograph. Assume that in one implementation the "what" classification is the first one to be provided, although in other implementations the "who" GUI may be presented first. Recognizing that photos from a source typically are interrelated, the classification of the immediately previously classified photo may be set as default for the current photo.

As recognized by the present invention, there is a finite number of categories that cover most photo subjects. In one non-limiting implementation the root level of the "what" GUI can include, as examples, vacation (with child labels indicating geographic locations), birthday, event (with child labels wedding, party, graduation, christening, etc.), holiday (with child labels Christmas, New Year, Thanksgiving, Halloween, Valentine day, Mothers Day, etc.), school, extracurricular (with child labels sports, hobby, festival, game, club, etc.), and family. It now should be understood that while the particular entries for any level may be heuristically determined and/or refined by research into how users classify photos, the particular method by which specific categories are established for the GUI is not limiting on the present invention.

At block 68, a "what" menu root part of the present GUI may be presented on the TV display in, e.g., the GUI pane 44. At block 70, the user manipulates the remote control 32 to enter selections from the GUI, which at block 72 are used to navigate down through the levels of the GUI as discussed further below to append a "what" tag to the photo.

In one non-limiting implementation, the "select" key 36 of the remote control 32 may be used to approve an action or select a category. The "back" key 48 can be selected to return to the TO DO pane 41, aborting any changes done, while the "left" arrow key 34, when located on the selected category or on the action buttons, can navigate back to the TO DO pane 41, aborting the changes. The "recycle" key 46 may be used to undo a selection whenever the user has deleted a picture, and the "home" key 50 can be used to abort the classification process.

At any level of the "what" GUI the user can indicate "done", e.g., the user may wish to simply label a photo as "vacation", or the user may wish to drill down further into the "what" GUI to append a proper place name to the photo, e.g., "Yosemite". Only the latest label from the GUI need be appended to the photo (e.g., the name "Yosemite"), or all of the relevant labels from upper GUI levels may be appended, e.g., "vacation, Yosemite" may be appended to the photo.

In any case, in state 74 of FIG. 4 the user may indicate "done" at the desired level selection by, e.g., manipulating one of the multipurpose buttons 52, 54 on the non-limiting remote control 32 shown in FIG. 2. When the user has completed a "what" classification, weights based on various selections may be determined at block 76 in accordance with further discussion below, and the GUI modified accordingly, as also discussed further below.

The user may wish to add another "what" classification to the photo, and accordingly can be prompted to "classify another "what" or move now to "who"?". For example, since, in the example given above, both "vacation" and "family" are in the "what" GUI, the user may wish to classify a photo as "vacation, Yosemite; family, kids" prior to moving to the "who" GUI to append proper names of the people in the photo.

The above process may then repeated using the below-described "who" GUI at block 78. In any case, it thus may be appreciated that the user classifies the photograph without having to manually type in text using alphabet keys.

Figure 5:
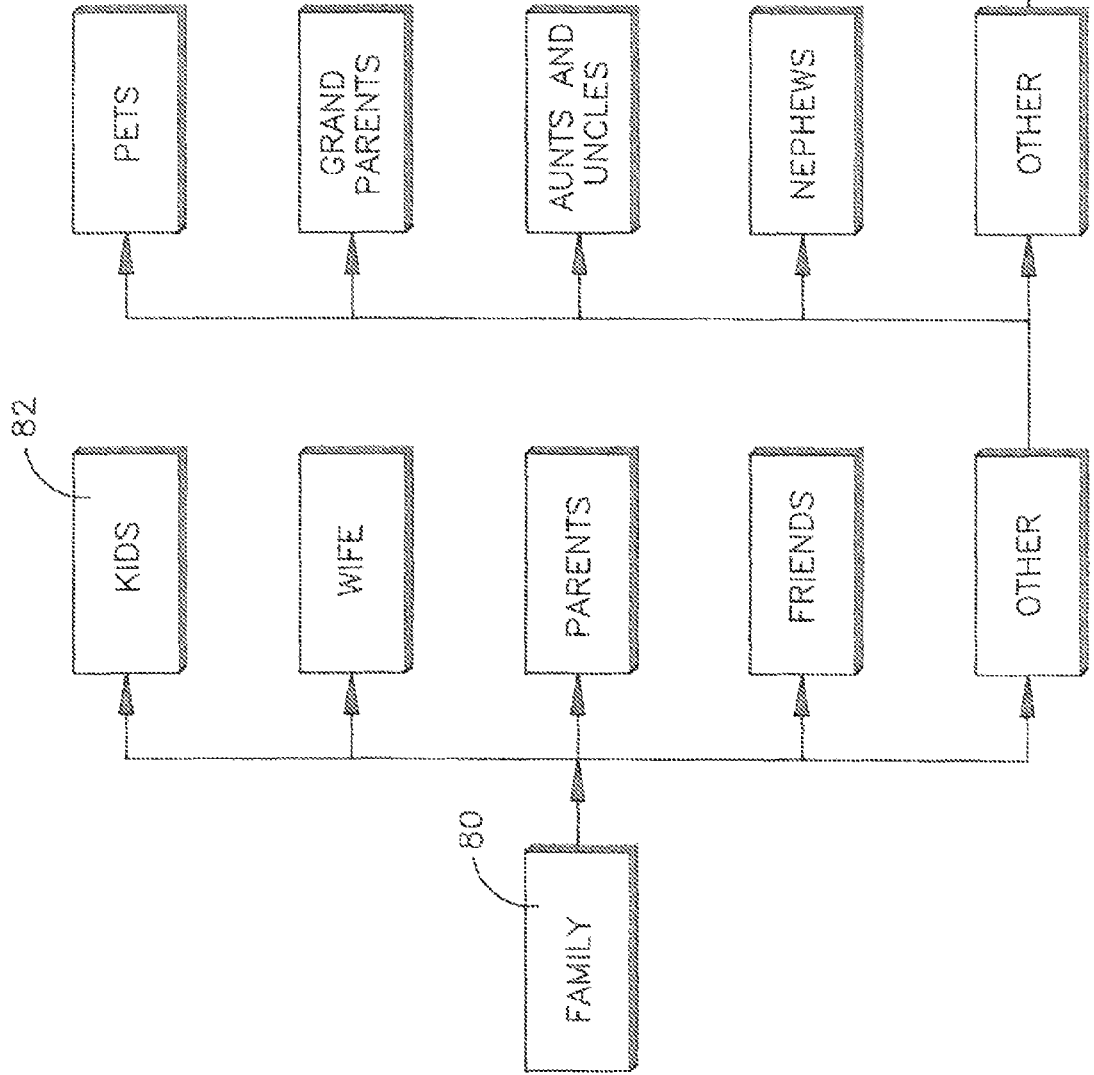
FIG. 5 is a screen shot of the TV display presenting a non-limiting "what" GUI, it being understood that the entire GUI need not be presented at once but rather that each successive level may be presented when selected.
Figure 5:
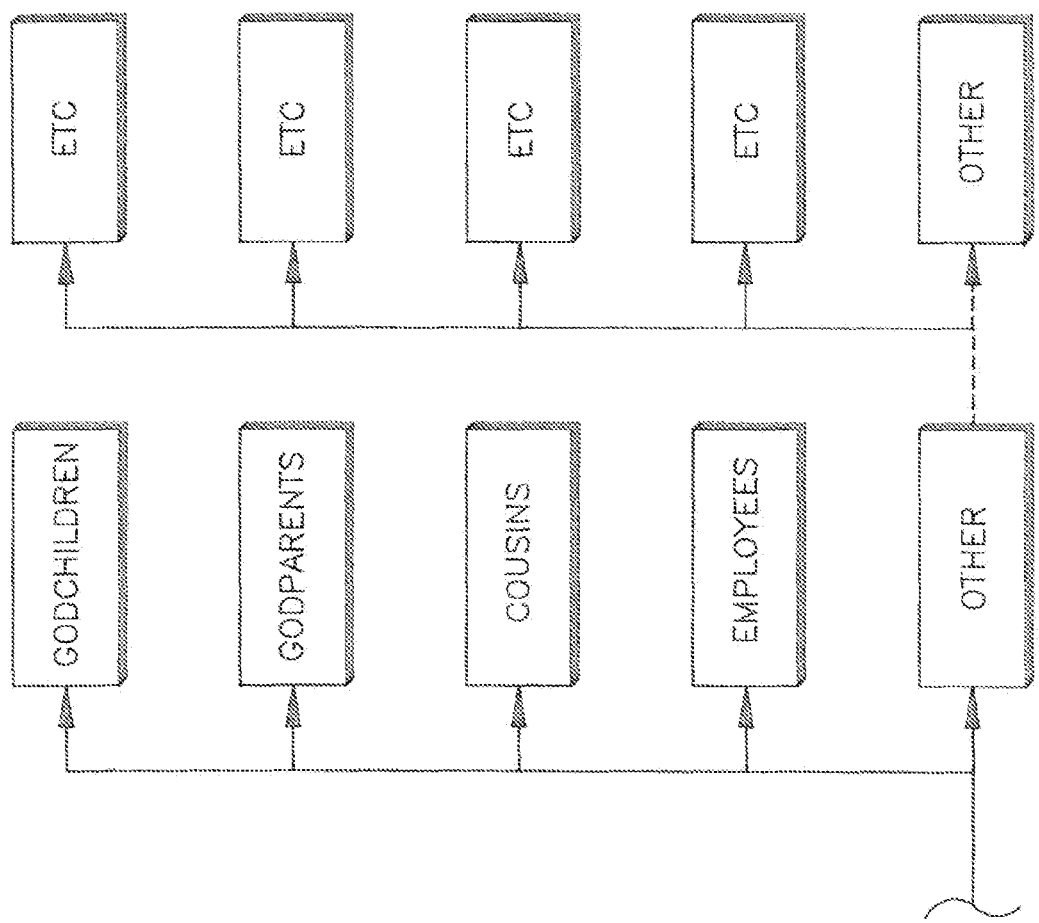

FIG. 5 illustrates an example of the "family" portion of a non-limiting "what" GUI. Starting at a root level 80 labelled, in the illustration shown, "family", a user may select, from a next level 82, "kids", "wife" or "spouse", "parents", "friends", or "other". Thus, the selections in a lower level of the GUI may be thought of as being species or children of the genre or parent node in the immediately preceding level.

It is to be understood that not all elements shown in FIG. 5 need be displayed at one time on the TV, to enable use of large and easy to see GUI elements. Accordingly, as shown a user may select "other" to cause additional child elements of the parent level 80 to be displayed, e.g., "pets", "grandparents", etc.

Figure 6:
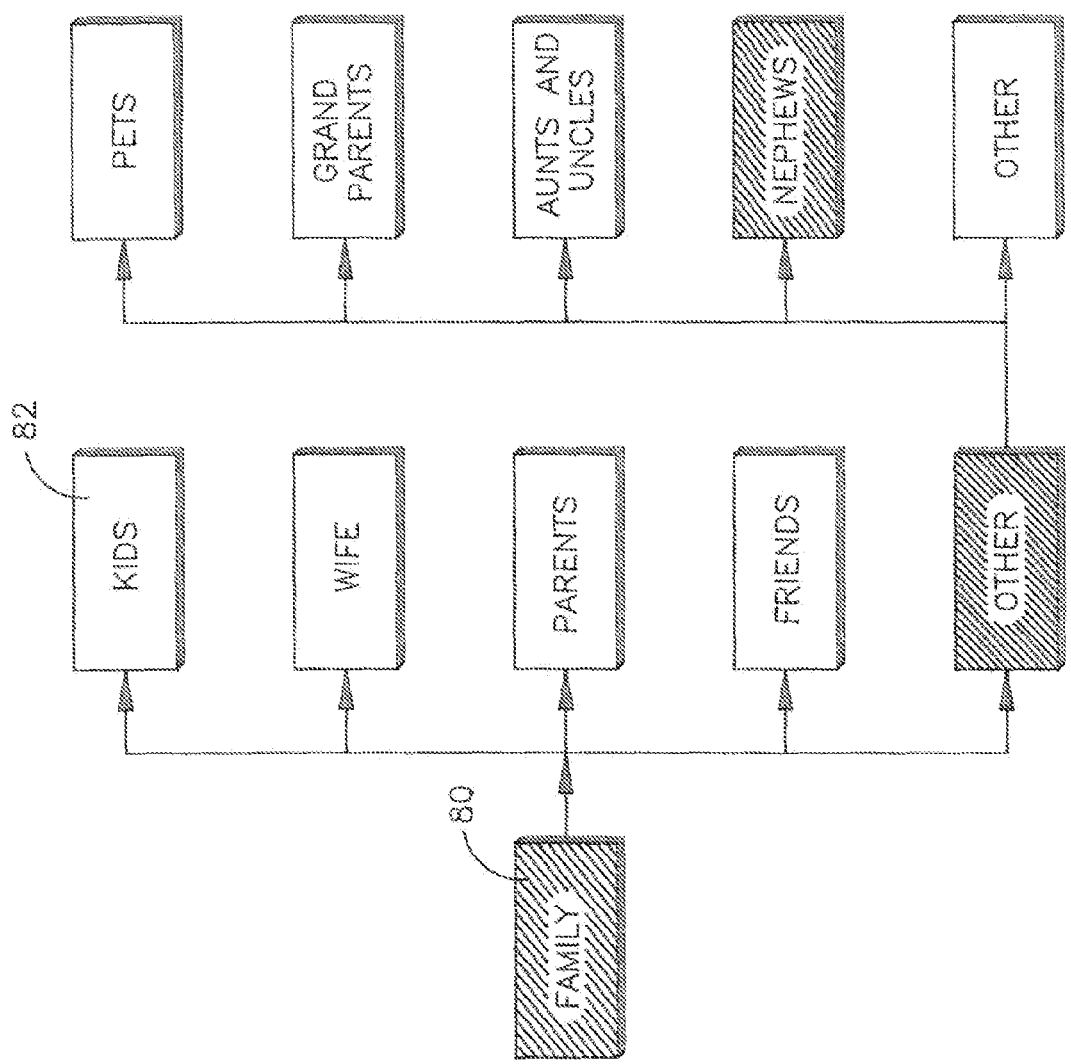
FIGS. 6 and 7 are non-limiting screen shots of parts of an exemplary "what" GUI illustrating how the GUI dynamically changes in response to user selections.
Figure 7:
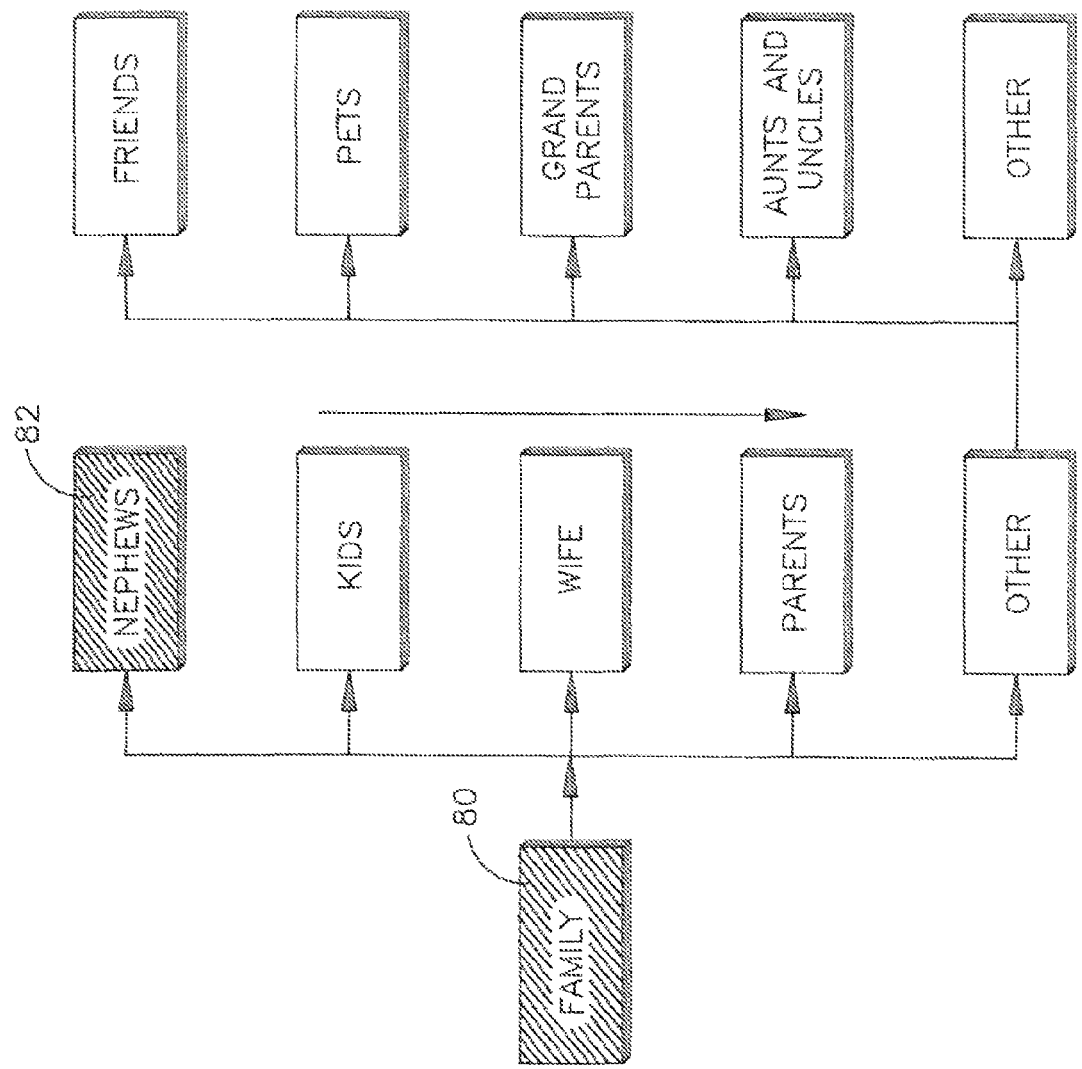

FIGS. 6-9 illustrate that in the preferred non-limiting embodiment, the GUIs are dynamic to account for user selections during GUI navigation. FIG. 6 shows that an initial default "family" portion of the "what" GUI displays in the initial first sub-level "kids", "wife" or "spouse", "parents", "friends", and "other". The user wishes to label the photo "nephews", so "other" must be selected to cause a subsequent first sub-level list to be displayed that contains additional "family" species including "nephews". In response to the user selecting "nephews" as a desired "what" label of the photo, the "what" GUI may be dynamically altered as shown in FIG. 7 to move the "nephew" label into the initial first sub-level, with the entry "friends" being demoted from the initial first sub-level list to the subsequent first sub-level list as shown. More generally, when the weight of a label reaches a threshold, it is automatically promoted for future classification sessions.

Figure 8:
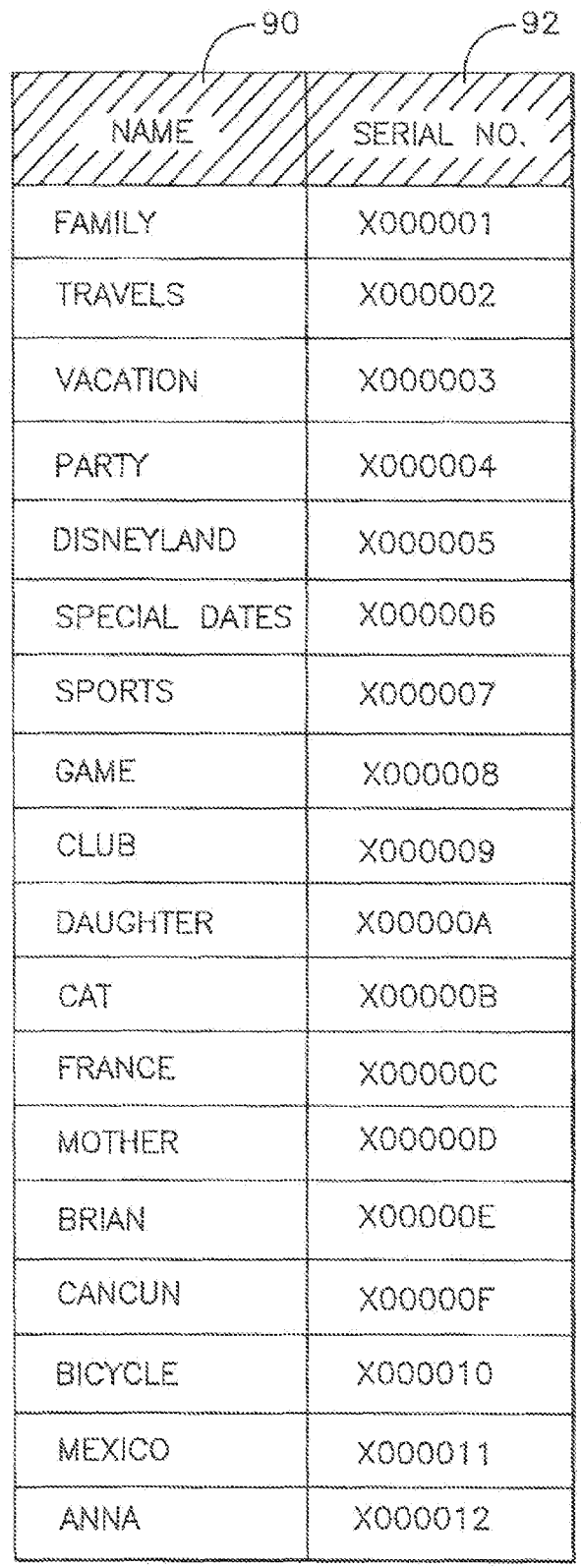

FIGS. 8 and 9 are tables that show a non-limiting example of data structure that may be maintained to effect the dynamic altering of the present GUI due to the present recognition that people tend to be consistent on the subjects of the pictures they take. For some, as an example, pictures will be family oriented, while for others it may be travel and vacations.

The present invention in non-limiting embodiments may employ a familiarity engine that provides the means for the system to automatically customize itself to match the preferences of the user. It is an indexing process where the different category items are sorted by weight. This weight changes as the particular categories are used. Default weights may be defined based on statistical studies.

In the embodiment to which FIGS. 8 and 9 are directed, each category (or label) is defined by a category or label name 90 and a serial number 92, which may be a unique twenty four bit code that is used to reference the category properties from the master category table shown in FIG. 8. As shown in FIG. 9, each root category or label has a category map associated with it. The map is defined by the serial number of the root, referencing the serial number of the category that is defined as root or predecessor, it is used to create relationships with child categories or labels as shown. In FIG. 9, the root serial number 000001 is correlated to four child serial numbers 94 and the root serial number 000002 also is correlated to four other child serial numbers 94.

For each child there is a position index 96, defined as an enumerated sequential number indicating its position in reference to the root (i.e., its display order on the GUI). Also, each child entry has a weight index 98, which may be implemented as a counter that can be initialized with a predetermined number and that decreases as the category is selected, it being understood that an increasing counter may be used. When a decreasing counter is used and the count reaches, e.g., zero, the category is promoted to the top of the list, i.e., with position index=0, and the rest of the child categories are demoted by one.

Figure 10:
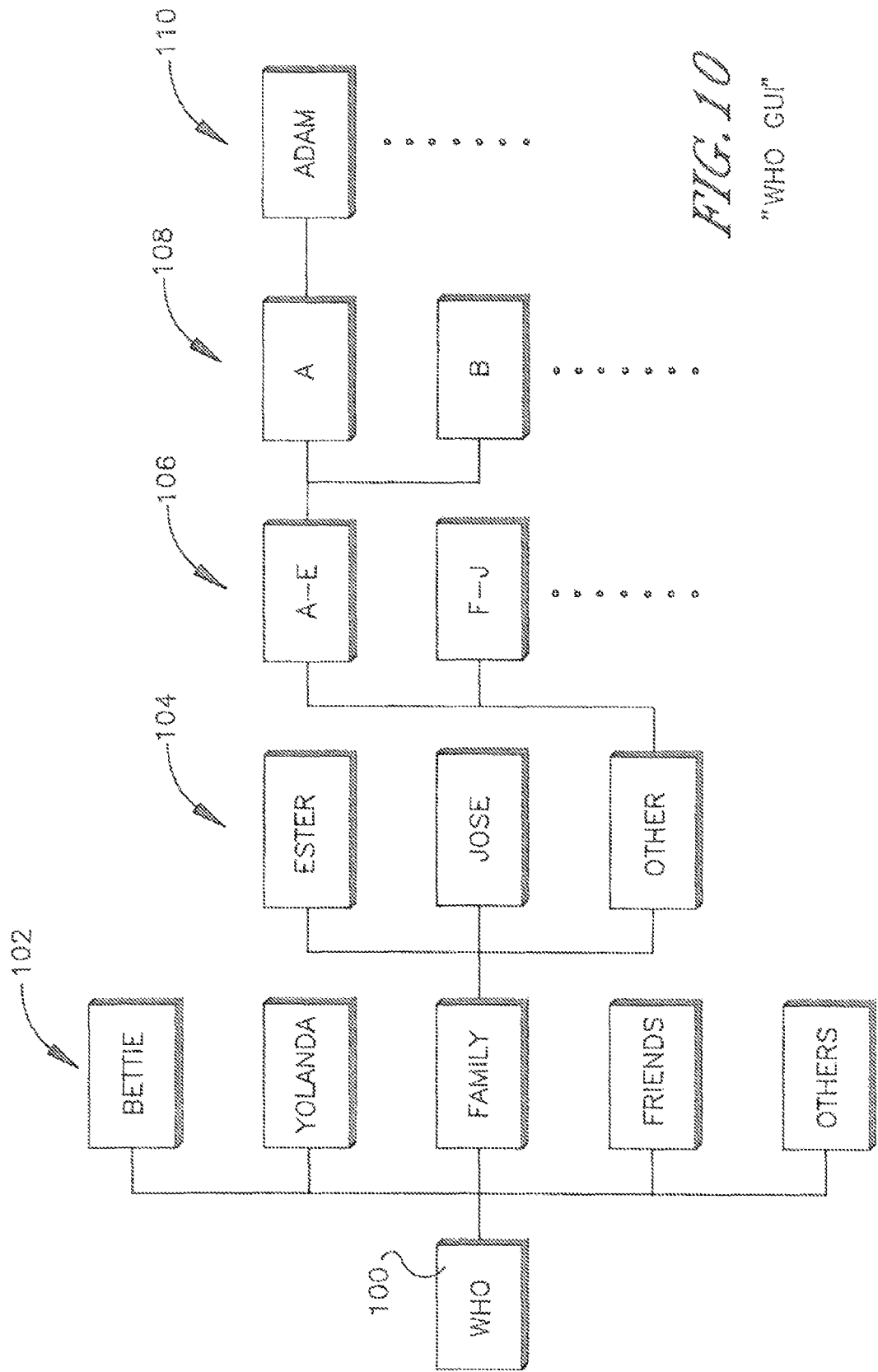
FIG. 10 is a screen shot of the TV display presenting a non-limiting "who" GUI, it being understood that the entire GUI need not be presented at once but rather that each successive level may be presented when selected.

FIG. 10 shows an example of a non-limiting "who" GUI that may be presented on the TV display after the user has indicated that he is done classifying the "what" part of a photo. Branching from the "who" root 100, two names ("Bettie" and "Yolanda") that, e.g., may have been previously used by the user to classify a photo are presented in a first sub-level 102, along with genre labels including "family", "friends", and "other". Thus, it may be appreciated that there may be some overlap between the "what" GUI and the "who" GUI, e.g., "family" may appear in both.

Assume the user has selected "family". A second sub-level 104 representing child labels of the "family" entry is presented as shown. Assume the user does not find the name he is looking for in the second sub-level 104, and so selects "other". A third sub-level 106 may appear which lists entries representing groups of sequential letters representing the first letters of proper names. In response to a selection of "A-E", entries in a fourth sub-level 108 are presented representing these letters. In response to selecting a letter (e.g., "A"), a fifth sub-level 110 is presented listing proper person names, e.g., "Adam". As the end of the fifth sub-level 110, which may present only four or five names, an "other" selection may be provided that a user can select to cause more names beginning with "A" to appear. In this way, a user can select the name of a person with which to label the photo in the current photo pane 40.

Returning to FIG. 3, when the search select element 64 is selected, the above GUIs may be presented and navigated through by a user to select search terms that the TV processor uses to return photos matching the search criteria. The returned photos may be designated by the user to establish an album by selecting, e.g., a prompt that indicates "group found photos into album", with the album bearing as its title the search terms.

While the particular SYSTEM AND METHOD FOR PHOTO ALBUM CREATION USING TELEVISION is herein shown and described in detail, it is to be understood that the subject matter which is encompassed by the present invention is limited only by the claims.

What is claimed is:

1. A method for classifying photographs using a TV having a TV display and a remote control wirelessly communicating with the TV, comprising:

providing at least one multi-level graphical user interface (GUI) selected from the group consisting of a "who" GUI operable to classify a photograph according to a name of at least one person appearing in the photograph and a "what" GUI operable to classify a photograph according to a name or genre of a subject associated with the photograph; and allowing a user of the remote control to navigate through levels of the GUI presented on the TV display to select a classification for at least one photograph provided to the TV, wherein the GUI includes photographic classification labels representing respective classifications, the photographic classification labels appearing on the GUI in locations that dynamically change based on weight, such that in response to a predetermined number greater than one of selections of a first photographic classification label, the first photographic classification label is moved into a higher level in the GUI and a second photographic classification label in the higher level is demoted to a lower level of the GUI, such that when the weight of a photographic classification label reaches a threshold, the photographic classification label is automatically promoted into a higher level of the GUI for more convenient visual reference of the label on the GUI for later photo classifications, a classification by person (s) in the photo and/or by subject matter in the photo(s) of a first photo being used as a default classification for a second photo immediately following the first photo in the digital album such that the second photo thereafter has a default classification being the same as the classification of the first photo.

2. The method of claim 1, comprising providing both a "who" GUI and a "what" GUI.

3. The method of claim 1, wherein the GUI is a "what" GUI having a "family" select element, selection of which causes a family relations level to appear on the TV display.

4. The method of claim 1, wherein the GUI is a "who" GUI and selection of an element from a relations level of the GUI causes name select elements, and/or alphabetic select elements, to appear on the TV display.

5. The method of claim 1, wherein the GUI is a "what" GUI having at least one select element the selection of which causes a geographic location level to appear on the TV display.

6. The method of claim 1, wherein the GUI is a "what" GUI having at least one select element the selection of which causes an event level to appear on the TV display, the event level including plural select elements each correlated to a respective generic event.

7. A TV system comprising:

a TV including a TV display;

a remote control wirelessly communicating with the TV;

a processor associated with the TV and presenting a GUI on the display, the processor receiving GUI select signals from the remote control and related to classifying digital photos by person(s) in the photo and/or by subject matter in the photo(s), the processor classifying the photos in accordance with the GUI signals, the photos being grouped in a digital album, a classification by person(s) in the photo and/or by subject matter in the photo(s) of a first photo being used as a default classification for a second photo immediately following the first photo in the digital album such that the second photo thereafter has a default classification being the same as the classification of the first photo.

8. The system of claim 7, wherein the GUI is a multi-level GUI selected from the group consisting of a "who" GUI operable to classify a photograph according to a name of at least one person appearing in the photograph and a "what" GUI operable to classify a photograph according to a name or genre of a subject associated with the photograph.

9. The system of claim 8, wherein the processor enables a user of the remote control to navigate through levels of the GUI presented on the TV display to select a classification for at least one photograph provided to the TV.

10. The system of claim 8, comprising both a "who" GUI and a "what" GUI.

11. The system of claim 7, wherein the GUI dynamically changes in response to GUI select signals.

12. The system of claim 7, wherein the GUI is a "what" GUI having a "family" select element, selection of which causes a family relations level to appear on the TV display.

13. The system of claim 7, wherein the GUI is a "who" GUI and selection of an element from a family relations level of the GUI causes name select elements, and/or alphabetic select elements, to appear on the TV display.

14. The system of claim 7, wherein the GUI is a "what" GUI having at least one select element the selection of which causes a geographic location level to appear on the TV display.

15. The system of claim 7, wherein the GUI is a "what" GUI having at least one select element the selection of which causes an event level to appear on the TV display, the event level including plural select elements each correlated to a respective generic event.

16. A TV system comprising:
a TV including a TV display;
a remote control wirelessly communicating with the TV;
a processor associated with the TV and presenting a GUI on the display, the processor receiving GUI select signals from the remote control and related to searching for digital photos by person(s) in the photo and/or by subject matter in the photo(s), the processor returning photos in accordance with the GUI signals for presentation on the display, the GUI signals being generated without manually typing in text using alphabet keys, at least some of the GUI select signals being used to establish weights for photo classification labels presented on the GUI, such that in response to a predetermined number of selections of a first label, the first label is moved into a higher level in the GUI and a second label in the higher level is demoted to a lower level of the GUI, such that when the weight of a label reaches a threshold, the label is automatically promoted into a higher level of the GUI for more convenient visual reference of the label on the GUI for later photo classifications, a classification by person(s) in the photo and/or by subject matter in the photo(s) of a first photo being used as a default classification for a second photo immediately following the first photo in the digital album such that the second photo thereafter has a default classification being the same as the classification of the first photo.

17. The system of claim 16, wherein the GUI is a multi-level GUI selected from the group consisting of a "who" GUI operable to search for a photograph according to a name of at least one person appearing in the photograph and a "what" GUI operable to search for a photograph according to a name or genre of a subject associated with the photograph.

18. The system of claim 16, comprising both a "who" GUI and a "what" GUI.

* * * * *